US005802109A

United States Patent [19]

Sano

[11] Patent Number: 5,802,109

[45] Date of Patent: Sep. 1, 1998

[54] SPEECH ENCODING COMMUNICATION SYSTEM

[75] Inventor: Hideo Sano, Tokyo, Japan

[73] Assignee: NEC Corporation, Tokyo, Japan

[21] Appl. No.: 623,152

[22] Filed: Mar. 28, 1996

[51] Int. Cl.$^6$ .................................................... H04B 14/06

[52] U.S. Cl. .......................... 375/245; 704/208; 704/214

[58] Field of Search ................................. 375/244, 245; 704/208, 210, 214, 215, 219, 262

[56] References Cited

U.S. PATENT DOCUMENTS 4,757,517 7/1988 Yatsuzuka .............................. 375/245
5,475,712 12/1995 Sasaki .................................... 375/241
5,710,862 1/1998 Urbanski ................................ 704/226

*Primary Examiner*—Stephen Chin
*Assistant Examiner*—Frederick Yu
*Attorney, Agent, or Firm*—Ostrolenk, Faber, Gerb & Soffen, LLP

[57] ABSTRACT

A speech encoding communication system for use with a land mobile radio telephone system which decreases an unfamiliar feeling to a sound output caused by a cyclic tone variation of background noise. On the transmission side, an audition weighting filter selectively receives a sound signal or an output of a low-pass filter for the sound signal in response to VOX mode information. In a sound absent condition based on the VOX mode information, a power quantizer outputs a power index calculated by an average of the power over a long period, and an LPC analyzer outputs a unique value as an LPC and an LSP quantizer outputs a quantized LSP index and a quantized LPC obtained when the LPC has the unique value in the sound absent condition. Further, an adaptive codebook search unit controls an adaptive codebook index to a unique value without performing searching processing. On the reception side, a power controller receives a quantized power, VOX mode information and a sound signal. When the VOX mode information represents a sound absent interval and background noise is to be produced, the power controller calculates an average of the quantized power over a long period and controls the power of the sound signal.

13 Claims, 4 Drawing Sheets

SPEECH ENCODING COMMUNICATION SYSTEM

BACKGROUND OF THE INVENTION

1. Field of the Invention

This invention relates to a speech encoding transmission system wherein speech is encoded and transmitted by and from the transmission side and then decoded on the reception side, and more particularly to a speech encoding transmission system for use with a land mobile radio telephone system of the digital mobile radio communication system.

2. Description of the Related Art

A general construction of a conventional transmission side system (mobile station) of a speech encoding communication system for use with a land mobile radio telephone system of the digital mobile radio communication system is shown in FIG. 3. Referring to FIG. 3, the transmission side system shown includes a power quantizer 2 for outputting a power index and a power value of a sound signal inputted to the transmission side system via an input terminal 1, an LPC analyzer 5 for outputting a linear predictive coefficient (LPC) and a line spectrum pair (LSP) from the inputted sound signal, a pitch analyzer 6 for applying linear predictive reverse filtering to the inputted sound signal and outputting a plurality of lag candidates from an auto-correlation of an LPC predictive residual signal, and a sound presence/absence detector 3 for receiving the sound signal and a predictive residual gain outputted from an LSP quantizer 4, detecting presence or absence of sound in the sound signal and outputting VOX MODE information (hereinafter referred to as "VOX mode information") representing a sound presence condition or a sound absence condition based on the detection. The power quantizer 2, the LPC analyzer 5, the pitch analyzer 6 and the sound presence/absence detector 3 are connected in parallel.

The LSP quantizer 4 mentioned above receives and quantizes the LSP outputted from the LPC analyzer 5, coverts the quantized LSP into a quantized LPC, and outputs an LSP index, the quantized LPC and a predictive residual gain. The transmission side system further includes an audition weighting filter 7 for receiving the LPC and calculating a filter coefficient to be used for audition weighting and for receiving the sound signal and outputting an audition weighted sound signal, an audition weighted synthesizing filter 9 for receiving the quantized LPC and a zero signal and outputting a zero input response signal, and a subtractor 10 for subtracting the zero input response signal from an output signal of the audition weighted synthesizing filter 9.

The transmission side system further includes an adaptive codebook search unit 11 for receiving an output signal of the subtractor 10, the quantized LPC and the lag candidates, calculating cross-correlations between signals obtained by weighted synthesis of the lag candidates and sound signals obtained by subtracting the zero input response output signal from the audition weighted sound signals, searching for an adaptive code vector signal with which a maximum value is exhibited among the cross-correlations and outputting an adaptive codebook index and the adaptive code vector signal, a random codebook search unit 12 for receiving the output signal of the subtractor 10, the quantized LPC and the adaptive code vector signal, calculating cross-correlations between signals obtained by orthogonalization of noise code vectors with the adaptive code vector signal and weighted synthesis of the orthogonalized noise code vectors and a signal obtained by subtraction of the zero input response output signal from the audition weighted sound signal, searching for a noise code vector signal with which a maximum value is exhibited among the cross-correlations and outputting a noise codebook index and the noise code vector signal, a gain codebook search unit 13 for receiving the output signal of the subtractor 10, the adaptive code vector signal, the noise code vector signal, the power value and the predictive residual gain, searching for a gain codebook with which the error between the output signal of the subtractor 10 and a sum value of the noise code vector signal multiplied by the gain and the adaptive vector signal exhibits a minimum value and outputting a gain codebook index, a VOX unique word generator 14 for outputting unique pattern data of a voice operated transmitter (VOX), and a data delivery section 15 for receiving the power index, the adaptive codebook index, the noise codebook index, the gain codebook index, the LSP index, the VOX unique word and the VOX mode information, converting the received information into coded data of a predetermined format and outputting the coded data.

The mobile station delivers, when a reverse-link sound signal is in a sound absent interval, a unique word representing stoppage and starting of coded index transmission and stops the output of a power amplifier to suppress power dissipation. Discrimination of whether sound is present or absent in the reverse-link sound signal is performed by the sound presence/absence detector 3.

The sound presence/absence detector 3 determines a sound absent condition when the power value of the sound signal is equal to or lower than a predetermined threshold value "1" (for example, −45 dBm) or when the predictive residual gain is equal to or higher than a predetermined threshold value "2" (for example, 0.4), but determines a sound present condition when the condition described above is not satisfied.

Further, the sound presence/absence detector 3 determines a condition wherein a sound present condition continues as state "0", another condition wherein changing over from the sound present condition to a sound absent condition occurs as state "1", a further condition wherein the sound absent condition continues as state "2". As the sound absent condition further continues, the state number increases like state "3", . . . state "25". The condition wherein changing over from the sound absent condition to a sound present condition occurs is determined as state "−1".

The sound presence/absence detector 3 outputs the state number as VOX mode information.

When also the condition subsequent to the condition at state "25" is a sound absent condition, the state number returns to state "1". Such returning of the state number is performed in order to deliver information of ambient noise of the mobile station at certain intervals to the base station.

The data delivery section 15 outputs, when the VOX mode information is state "0" or one of state numbers equal to or higher than state "2", coded indices (the power index, adaptive codebook index, noise codebook index, gain codebook index and LSP index) in a predetermined data format.

On the other hand, when the VOX mode information is state "1", the data delivery section 15 outputs a unique word (called "postamble") conveying stoppage of coded index transmission in the predetermined data format, but when the VOX mode information is state "−1", the data delivery section 15 outputs a unique work (called "preamble") conveying starting of coded index transmission in the predetermined data format.

FIG. 4 shows a construction of a conventional reception side system (base station) of the speech encoding communication system for use with a land mobile radio telephone system of the digital mobile radio communication system. Referring to FIG. 4, a data reception section 102 receives coded data from an input terminal 101 and demultiplexes and outputs a power index 102*a*, an adaptive code index 102*b*, a noise code index 102*c*, a gain code index 102*d* and a line spectrum pair (LSP) index 102*e*. The data reception section 102 outputs the inputted coded data as coded data 102*f* to a voice operated transmitter (VOX) unique word detector 103.

A mobile station transmits, when an encoder thereof discriminates that a reverse-link sound signal is in a sound absent interval, a unique word of a VOX and stops transmission of coded indices in order to minimize the power dissipation. The unique word of a VOX includes a postamble which conveys stoppage of coded index transmission and a preamble which conveys starting of coded index transmission as described above. Further, when sound absent intervals successively appear, a post amble and coded data for updating background noise are transmitted cyclically.

The VOX unique word detector 103 detects a postamble and a preamble outputted from a mobile station and outputs VOX MODE information representative of a sound present interval or a sound absent interval. Here, the VOX mode Information is set, for example, to state "−1" when a preamble is detected, to state "1" when a postamble is detected, to state "2" when coded indices are received subsequently to the postamble, to state "3" when a coded index is received until a preamble is thereafter received, and to state "0" when a coded index is received after the preamble is detected.

A power code decoder 104 outputs a quantized power value 104*a* from a power codebook based on the power index 102*a*.

An LSP code decoder 105 outputs an LPC 105*a* and a predictive residual gain 105*b* from an LSP codebook based on the LSP index 102*e*.

A gain code decoder 106 receives the quantized power value 104*a*, the predictive residual gain 105*b* and the gain code index 102*d* and outputs an adaptive code gain coefficient 106*a* and a noise code gain coefficient 106*b* from a gain codebook based on the gain code index 102*d*.

A random code signal decoder 107 outputs a noise code vector signal 107*a* based on the noise code index 102*c*.

An adaptive code signal decoder 108 outputs an adaptive code vector signal 108*a* based on the adaptive code index 102*b*.

An adaptive codebook used by the adaptive code signal decoder 108 is updated by an excitation signal 111*a* to produce a new adaptive codebook.

An output signal obtained by multiplying the adaptive code vector signal 108*a* by the adaptive code gain coefficient 106*a* by means of a multiplier 109 and another output signal obtained by multiplying the noise code vector signal 107*a* by the noise code gain coefficient 106*b* by means of another multiplier 110 are added by an adder 111 to produce an excitation signal 111*a*.

A synthesizing filter 112 receives the LPC 105*a* and the excitation signal 111*a* and outputs a synthetic sound signal 112*a*.

Further, the auditory quality of the synthetic sound signal 112*a* is improved by an adaptive spectrum post filter 113, and a resulted sound signal is outputted from an output terminal 116.

When the VOX mode information represents a sound absent interval, background noise is produced using the indices in coded data succeeding a postamble as initial values.

In the conventional speech encoding communication system described above, when the reverse-link sound signal of the mobile station represents absence of sound, a unique word is delivered and transmission of coded indices to the base station is stopped. However, when sound absent conditions successively appear, coded indices are cyclically transmitted as information of ambient noise to the base station. The base station side thus produces background noise based on the information of ambient noise.

Accordingly, the conventional speech encoding communication system is disadvantageous in that background noise which varies cyclically is very unfamiliar noise different from sound obtained by encoding and decoding of ordinary noise.

SUMMARY OF THE INVENTION

It is an object of the present invention to provide a speech encoding communication system for use with a land mobile radio telephone system of a digital mobile radio communication system which decreases an unfamiliar feeling caused by a cyclic tone variation of background noise transmitted when absence of sound is detected in VOX (or VAD: Voice Activity Detect) processing of a mobile station.

In order to attain the object described above, according to an aspect of the present invention, there is provided a speech encoding communication system which comprises a power quantizer for calculating and quantizing a power value of a sound signal inputted to the speech encoding communication system and outputting a power index and the quantized power value, a pitch analyzer for applying linear predictive reverse filtering to the sound signal and outputting a plurality lag candidates from an auto-correlation of an linear predictive coefficient predictive residual signal, a sound presence/absence detector for receiving the sound signal and a predictive residual gain, detecting presence or absence of sound from the sound signal and outputting VOX mode information representing a sound present condition or a sound absent condition, a linear predictive coefficient detector for calculating and outputting a linear predictive coefficient from the sound signal, for converting the linear predictive coefficient into a line spectrum pair and outputting the line spectrum pair and for receiving the VOX mode information outputted from the sound presence/absence detector and outputting, when the VOX mode information represents a sound absent condition, a unique value as the linear predictive coefficient, the power quantizer, the pitch analyzer, the sound presence/absence detector and the linear predictive coefficient analyzer being connected in parallel, a line spectrum pair quantizer for receiving and quantizing the line spectrum pair, converting the quantized line spectrum pair into a quantized linear predictive coefficient and outputting a line spectrum pair index, the quantized linear predictive coefficient and a predictive residual gain which is to be inputted to the sound presence/absence detector, an audition weighting filter for receiving the linear predictive coefficient and calculating a filter coefficient to be used for audition weighting and for receiving the sound signal and outputting an audition weighted sound signal, an audition weighted synthesizing filter for receiving the quantized linear predictive coefficient and a zero signal and outputting a zero input response signal, a subtractor for subtracting the zero input response signal from the output signal of the audition weighting filter, an adaptive codebook search unit for receiving an output signal of the subtractor, the quantized linear predictive coefficient and the lag candidates, calculating cross-correlations between signals obtained by weighted synthesis of the lag candidates and a signal obtained by subtraction of the zero input response output signal from the audition weighted sound signal, searching for a noise code vector signal with which a maximum value is exhibited among the cross-correlations and outputting an adaptive codebook index and an adaptive code vector signal, a random codebook search unit for receiving the output signal of the subtractor, the quantized linear predictive coefficient and the adaptive code vector signal, calculating cross-correlations between signals obtained by orthogonalization and weighted synthesis processing of individual noise code vectors with the adaptive code vector signal and a signal obtained by subtraction of the zero input response output signal from the audition weighted sound signal, searching for a noise code vector signal with which a maximum value is provided among the cross-correlations, and outputting a noise codebook index and the noise code vector signal, a gain codebook search unit for receiving the output signal of the subtractor, the adaptive code vector signal, the noise code vector signal, the power value and the predictive residual gain, searching for a gain codebook with which an error of the output signal of the subtractor from a sum value of the noise code vector signal multiplied by a gain and the adaptive code vector signal exhibits a minimum value, and outputting a gain codebook index, a VOX unique word generator for outputting unique pattern data of a VOX, and a data delivery section for receiving the power index, the adaptive codebook index, the noise codebook index, the gain codebook index, the line spectrum pair index, a VOX unique word outputted from the VOX unique word generator and the VOX mode information, converting the inputted information into coded data of a predetermined format and outputting the coded data.

With the speech encoding communication system, different condition control is performed in a sound presence condition or a sound absence condition of an inputted sound signal based on VOX mode information. Consequently, the speech encoding communication system is advantageous in that an unfamiliar feeling which is caused by a cyclic tone variation of background noise outputted from a decoder of a base station can be reduced.

Preferably, the speech encoding communication system further comprises a low-pass filter for suppressing high frequency components of the inputted sound signal and outputting a resulted signal, and the audition weighting filter selectively receives the speech signal or the output signal of the low-pass filter in response to the VOX mode information outputted from the sound presence/absence detector and outputs an audition weighted sound signal. In this instance, since low-pass filtering is applied to a sound signal to be inputted to the audition weighting filter when the VOX mode information represents a sound absent condition, frequency emphasis of background noise by an adaptive spectrum post filter which is used to improve the auditory quality of synthetic speech is suppressed.

Preferably, the power quantizer receives the VOX mode information outputted from the sound presence/absence detector and outputs, when the VOX mode information represents a sound absent condition, a power index calculated from a power value obtained by averaging the power value over a long period. Since such long period averaging is involved, the speech encoding communication system is advantageous in that a sudden level variation by unexpected noise of the power level of background noise produced by a decoder of a base station is suppressed.

Preferably, the line spectrum pair quantizer receives the VOX mode information outputted from the sound presence/absence detector and outputs, when the VOX mode information represents a sound absent condition, a quantized line spectrum pair index and a quantized linear predictive coefficient obtained when the linear predictive coefficient has a unique value. Since the quantized line spectrum pair index having a fixed value is outputted, otherwise necessary searching processing can be eliminated. Consequently, the calculation amount can be reduced remarkably and also the power dissipation can be reduced.

Preferably, the adaptive codebook search unit receives the VOX mode information outputted from the sound presence/absence detector and outputs, when the VOX mode information represents a sound absent condition, a unique value as the adaptive codebook index. Further preferably, the adaptive codebook search unit receives the VOX mode information outputted from the sound presence/absence detector and controls, when the VOX mode information represents a sound absent condition, the adaptive codebook index to the unique value without performing searching processing. Since the adaptive codebook search unit outputs the adaptive codebook index of the unique value, there is an advantage in that a cyclic variation of background noise is suppressed, and otherwise necessary searching processing can be reduced. Consequently, the calculation amount is reduced remarkably and also the power dissipation can be reduced.

According to another aspect of the present invention, there is provided a speech encoding communication system which comprises a low-pass filter for attenuating high frequency components from a sound signal inputted to the speech encoding communication system, a sound presence/absence detector for receiving the sound signal and a predictive residual gain, detecting presence or absence of sound from the sound signal and outputting VOX mode information representing a sound present condition or a sound absent condition, an audition weighting filter for selectively receiving the speech signal or an output of the low-pass filter in response to the VOX mode information outputted from the sound presence/absence detector and outputting an audition weighted sound signal, a power quantizer for receiving the VOX mode information outputted from the sound presence/absence detector and outputting, when the VOX mode information represents a sound absent condition, a power index calculated from a power value averaged over a long period, a linear predictive coefficient detector for receiving the VOX mode information outputted from the sound presence/absence detector and outputting, when the VOX mode information represents a sound absent condition, a unique value as a linear predictive coefficient, a line spectrum pair quantizer for receiving the VOX mode information outputted from the sound presence/absence detector and outputting, when the VOX mode information represents a sound absent condition, a quantized line spectrum pair index and a quantized linear predictive coefficient obtained when the linear predictive coefficient has a unique value, a pitch analyzer for applying linear predictive reverse filtering to the inputted sound signal and outputting a plurality lag candidates from an auto-correlation of an linear predictive coefficient predictive residual signal, an adaptive codebook search unit for receiving the VOX mode information outputted from the sound presence/absence detector and controlling, when the VOX mode information represents a sound absent condition, an adaptive codebook index to a unique value without performing searching processing, a random codebook search unit for searching for a noise code vector signal and outputting a noise codebook index and the noise code vector signal, a gain codebook search unit for outputting a gain codebook index, a VOX unique word generator for outputting unique pattern data of a VOX, and a data delivery section for receiving the power index, the adaptive codebook index, the noise codebook index, the gain codebook index, the line spectrum pair index, a VOX unique word outputted from the VOX unique word generator and the VOX mode information, converting the inputted information into coded data of a predetermined format and outputting the coded data.

With the speech encoding communication system, different condition control is performed in a sound presence condition or a sound absence condition of an inputted sound signal based on VOX mode information. Consequently, the speech encoding communication system is advantageous in that an unfamiliar feeling which is caused by a cyclic tone variation of background noise outputted from a decoder of a base station can be reduced. Further, since low-pass filtering is applied to a sound signal to be inputted to the audition weighting filter when the VOX mode information represents a sound absent condition, frequency emphasis of background noise by an adaptive spectrum post filter which is used to improve the auditory quality of synthetic speech is suppressed. Furthermore, since long period averaging of the power value over a long period is involved, the speech encoding communication system is advantageous in that a sudden level variation by unexpected noise of the power level of background noise produced by a decoder of a base station is suppressed. Besides, since the quantized line spectrum pair index having a fixed value is outputted, otherwise necessary searching processing can be eliminated. Consequently, the calculation amount can be reduced remarkably and also the power dissipation can be reduced. In addition, since the adaptive codebook search unit outputs the adaptive codebook index of the unique value, there is an advantage in that a cyclic variation of background noise is suppressed, and otherwise necessary searching processing can be reduced. Consequently, the calculation amount is reduced remarkably and also the power dissipation can be reduced.

According to a further aspect of the present invention, there is provided a speech encoding communication system which comprises a data reception section for receiving and separating coded data into a power index, an adaptive code index, a noise code index, a gain code index and a line spectrum pair index and outputting the thus separated indices and the received coded data, a VOX unique word detector for receiving the coded data outputted from the data reception section and outputting VOX mode information, a power code decoder for receiving the power index and the VOX mode information and outputting a quantized power, a noise code decoder for receiving the noise code index and the VOX mode information and outputting a noise code vector signal, a line spectrum pair code decoder for receiving the line spectrum pair index and the VOX mode information and outputting a linear predictive coefficient and a predictive residual gain, a gain code decoder for receiving the gain code index, the VOX mode information, the quantized power value and the predictive residual gain and outputting an adaptive code gain coefficient and a noise code gain coefficient, an adaptive code signal decoder for receiving the adaptive code index, the VOX mode information and an excitation signal and outputting an adaptive code vector signal, an adder for adding a signal obtained by multiplication of the adaptive code vector signal by the adaptive code gain coefficient and another signal obtained by the noise code vector signal by the noise code gain and outputting an excitation signal to be inputted to the adaptive code signal decoder, a synthesizing filter for receiving the excitation signal and the linear predictive coefficient and outputting a synthetic sound signal, a post filter for receiving the synthetic sound signal and the linear predictive coefficient and outputting a sound signal, and a power controller for receiving the quantized power, the VOX mode information and the sound signal and controlling the power of the sound signal to be outputted from the post filter when the VOX mode information represents a sound absent interval and background noise is to be produced.

Preferably, the power controller receives the quantized power, the VOX mode information and the sound signal, and, when the VOX mode information represents a sound absent interval and background noise is to be produced, calculates an average of the quantized power over a long period and controls the power of the sound signal to be outputted from the post filter so that the sound signal may have a power equal to the average of the quantized power over the long period. In this instance, preferably the post filter receives the synthetic sound signal, the linear predictive coefficient and the VOX mode information and does not perform filtering when the VOX mode information represents a sound absent interval and background noise is to be produced. Further preferably, the adaptive code signal decoder receives the adaptive code index, the VOX mode information and the excitation signal and outputs, when the VOX mode information represents a sound absent interval and background noise is to be produced, a fixed index as the adaptive code vector signal in place of the adaptive code index inputted thereto.

With the speech encoding communication system, different condition control is performed in a sound presence condition or a sound absence condition of an inputted sound signal based on VOX mode information. Consequently, the speech encoding communication system is advantageous in that an unfamiliar feeling which is caused by a cyclic tone variation of background noise outputted from a decoder of a base station can be reduced. Further, when the VOX mode information exhibits a sound absent condition, frequency emphasis of background noise by the adaptive spectrum post filter which is used to improve the auditory quality of a synthetic speech signal is suppressed. Furthermore, since long period averaging of the power value in a sound absent interval over a long period is involved, the speech encoding communication system is advantageous in that a sudden level variation by unexpected noise of the power level of background noise. In addition, since the adaptive code decoder produces an adaptive code vector signal with a fixed index, the speech encoding communication system is advantageous also in that a cyclic variation of background noise is suppressed.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
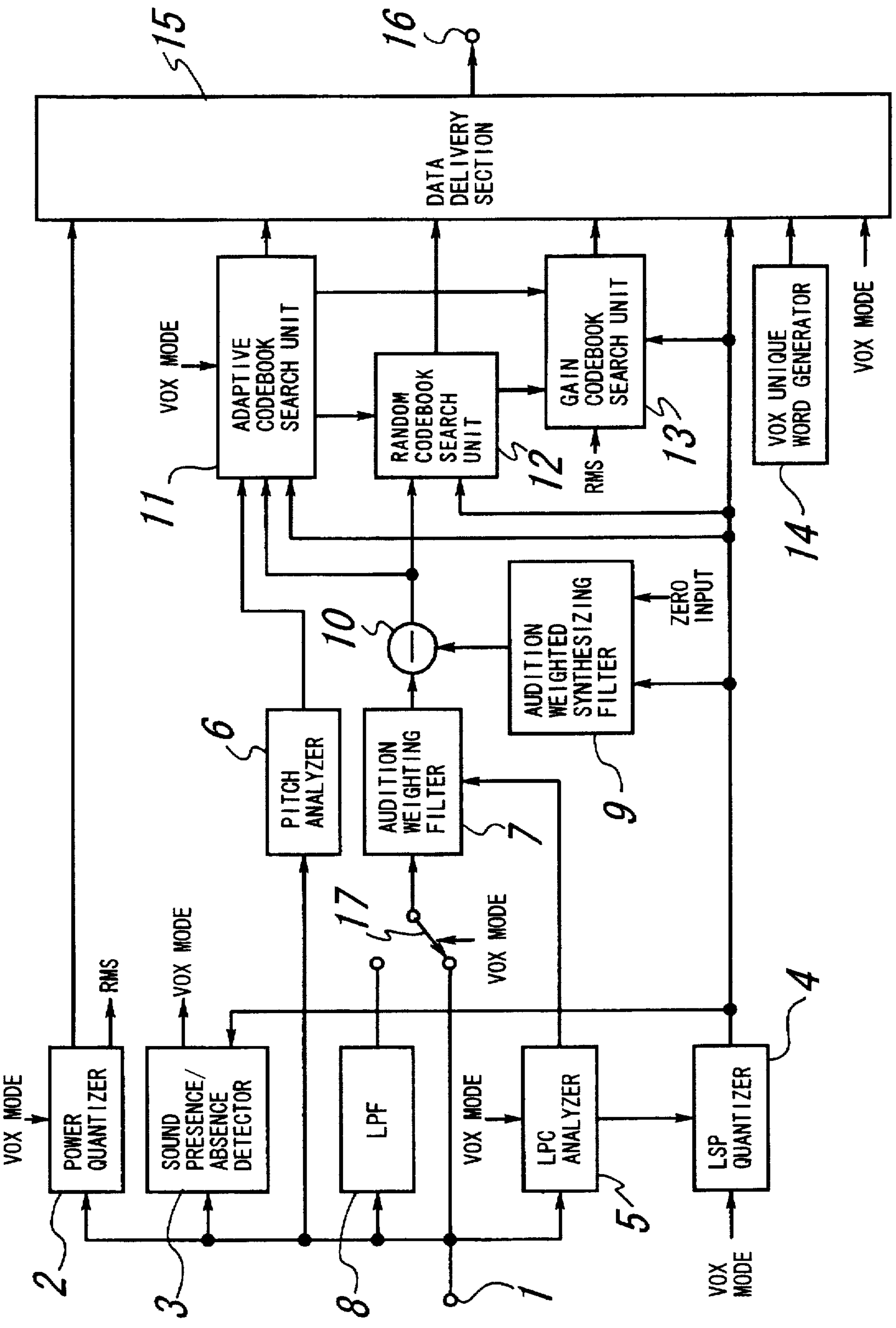
FIG. 1 is a block diagram showing an example of a construction of a transmission side system of a speech encoding communication system to which the present invention is applied.
Figure 3:
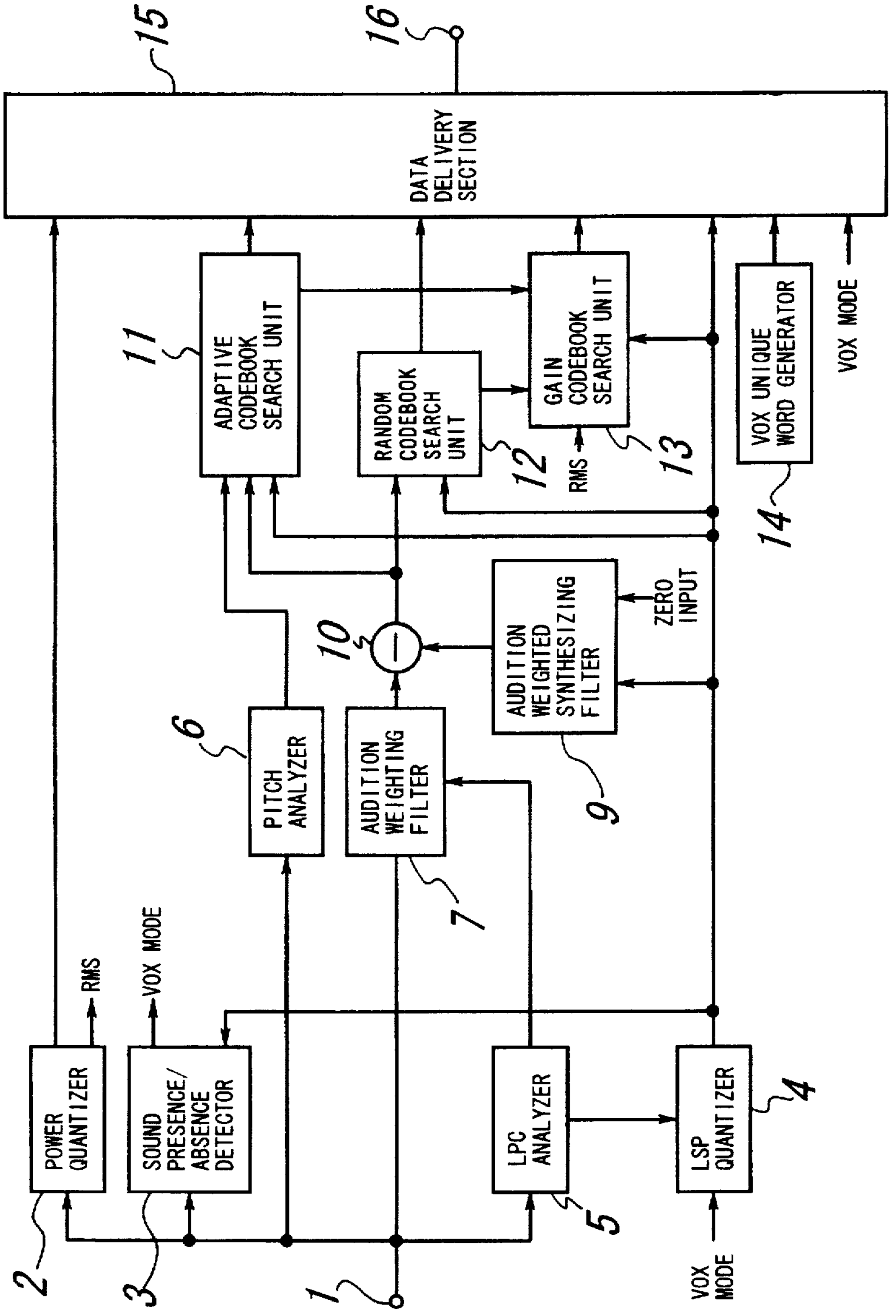
FIG. 3 PRIOR ART
FIG. 3 is a block diagram showing a construction of a transmission side system of a conventional speech encoding communication system.

Referring first to FIG. 1, there is shown in block diagram an example of a construction of a transmission side system of a speech encoding communication system to which the present invention is applied. The transmission side system shown is an improvement to and includes several common components with the transmission side system of the conventional speech encoding communication system described hereinabove with reference to FIG. 3, but is generally different in that it additionally includes a low-pass filter (LPF) 8 and a switch 17 and the sound presence/absence detector 3, the LPC analyzer 5 and the LSP quantizer 4 have somewhat different functions to those of the conventional transmission side system of FIG. 3.

In particular, a sound signal is inputted via the input terminal 1. The power quantizer 2 calculates a power value of the sound signal inputted via the input terminal 1, searches for a best approximate index of a quantized power value from a power codebook prepared in advance by learning and outputs the thus searched out index as a power index. Further, the power quantizer 2 outputs a power value quantized based on the searched out power index (the quantized power value may be hereinafter referred to as "RMS"). However, particularly when the VOX MODE information inputted thereto from the sound presence/absence detector 3 represents a sound absent condition, the power quantizer 2 calculates a power value averaged over a long period of time of the sound absent interval, searches for a best approximate index of a quantized power value from the power codebook and outputs the searched out index as a power index.

Such averaging over a long period of time suppresses a sudden level variation by unexpected noise of the power level of background noise produced by a decoder of a base station.

The sound presence/absence detector 3 receives the sound signal from the input terminal 1 and a predictive residual gain outputted from the LSP quantizer 4, detects presence or absence of sound and outputs VOX mode information representing a sound present condition or a sound absent condition. The VOX mode information is set such that it represents a condition wherein a sound present condition continues as state "0", another condition wherein changing over from the sound present condition to a sound absent condition occurs as state "1", a further condition wherein the sound absent condition continues as state "2". Further, as the sound absent condition further continues, the state number increases like state "3", . . . state "25". Then, when also the condition subsequent to the condition at state "25" is a sound absent condition, the state number returns to state "1". The condition wherein changing over from the sound absent condition to a sound present condition occurs is determined as state "−1".

The sound presence/absence detector 3 makes a determination between sound present and absent conditions such that it determines a sound absent condition when the power value of the sound signal is equal to or lower than a predetermined threshold value "1" (for example, −45 dBm) or when the predictive residual gain is equal to or higher than a predetermined threshold value "2" (for example, 0.2), but determines a sound present condition when the condition described above is not satisfied.

The LPC analyzer 5 receives the sound signal from the input terminal 1, calculates an LPC by an auto-correlation method or a covariance method, performs parameter conversion from the LPC into an LSP, and outputs the LPC and the LSP. The LPC analyzer 6 outputs, particularly when the VOX mode information inputted from the sound presence/absence detector 3 represents a sound absent condition, a unique or fixed value (for example, a value with which the transfer function of the synthesizing filter which uses the LPC becomes equal to 1) as the LPC. Since the LSP is used to calculate a predictive residual gain, similar replacement of output data is not performed for the LSP.

The pitch analyzer 6 receives the sound signal from the input terminal 1, applies linear predictive reverse filtering to the inputted sound signal and outputs a plurality lag candidates from an auto-correlation of the LPC predictive residual signal.

The LSP quantizer 4 receives and quantizes the LSP outputted from the LPC analyzer 5, converts the quantized LSP into a quantized LPC, and outputs an LSP index, the quantized LPC and a predictive residual gain.

The audition weighting filter 7 receives the LPC outputted from the LPC analyzer 5 and calculates an audition weighting filter coefficient. The audition weighting filter 7 is connected to the switch 17 so that, when the VOX mode information inputted thereto from the sound presence/absence detector 3 represents a sound absent condition, the audition weighting filter 7 receives an output signal of the LPF 8 which blocks or attenuates predetermined high frequency components of the sound signal, but receives the sound signal from the input terminal 1 when the VOX mode information represents a sound present condition. Then, the audition weighting filter 7 outputs an audition weighted sound signal. Further, the audition weighted synthesizing filter 9 receives the quantized LPC and a zero signal and outputs a zero input response signal.

The subtractor 10 subtracts the zero input response signal from the output signal of the audition weighting filter 7.

The adaptive codebook search unit 11 receives an output signal of the subtractor 10, the quantized LPC and the plurality of lag candidates, calculates cross-correlations between signals obtained by weighted synthesis of the lag candidates and a signal obtained by subtraction of the zero input response output signal from the audition weighted sound signal, searches for a noise code vector signal with which a maximum value is exhibited among the cross-correlations and outputs an adaptive codebook index and an adaptive code vector signal.

The adaptive codebook search unit 11 outputs, particularly when the VOX mode information inputted thereto from the sound presence/absence detector 3 represents a sound absent condition, a peculiar or fixed value (for example, an index which does not depend upon an adaptive codebook) as an adaptive codebook index. In this instance, since the fixed index is delivered, the adaptive codebook search unit 11 can eliminate its searching processing, resulting in reduction in calculation amount and in power dissipation.

The random codebook search unit 12 receives the output signal of the subtractor 10, the quantized LPC and the adaptive code vector signal, calculates cross-correlations between signals obtained by performing orthogonalization and weighted synthesis processing of individual noise code vectors with the adaptive code vector signal and a signal obtained by subtraction of the zero input response output signal from the audition weighted sound signal, searches for a noise code vector signal with which a maximum value is provided among the cross-correlations, and outputs a noise codebook index and the noise code vector signal.

The gain codebook search unit 13 receives the output signal of the subtractor 10, the adaptive code vector signal, the noise code vector signal, the power value and the predictive residual gain, searches for a gain codebook with which an error of the output signal of the subtractor 10 from a sum value of the noise code vector signal multiplied by a gain and the adaptive code vector signal exhibits a minimum value, and outputs a gain codebook index.

The VOX unique word generator 14 outputs peculiar pattern data of a VOX.

The unique word of a VOX includes a postamble which conveys stoppage of coded index transmission and a preamble which conveys starting of coded index transmission.

The data delivery section 15 receives the power index, the adaptive codebook index, the noise codebook index, the gain codebook index, the LSP index, the VOX unique word and the VOX mode information, converts the inputted information into coded data of a predetermined format, and outputs the coded data. Further, when the VOX mode information represents state "0" or state "2" or more, the data delivery section 15 outputs the coded indices (the power index, adaptive codebook index, noise codebook index, gain codebook index and LSP index). On the other hand, when the VOX mode information represents state "1", the data delivery section 15 outputs a postamble, but when the VOX mode information represents state "−1", the data delivery section 15 outputs a preamble.

With the transmission side system of the speech encoding communication system described above, when the VOX mode information represents a sound absent condition, the LPF 8 is applied to the sound signal to be inputted to the audition weighting filter 7 so that frequency emphasis of background noise by an adaptive spectrum post filter which is used in order to raise the auditory quality of synthesized sound is suppressed. On the other hand, the power value in a sound absent interval is averaged over a long period of time by the power quantizer 2 so that a sudden level variation of the power level of background noise, which is produced by a decoder of a base station, caused by unexpected noise can be suppressed.

It is to be noted that a synchronized variation of background noise is advantageously suppressed using a fixed index outputted from the adaptive codebook search unit 11. Further, searching processing can be omitted by outputting of such fixed index, and consequently, the calculation amount is reduced remarkably and the power dissipation can be reduced as much.

Figure 2:
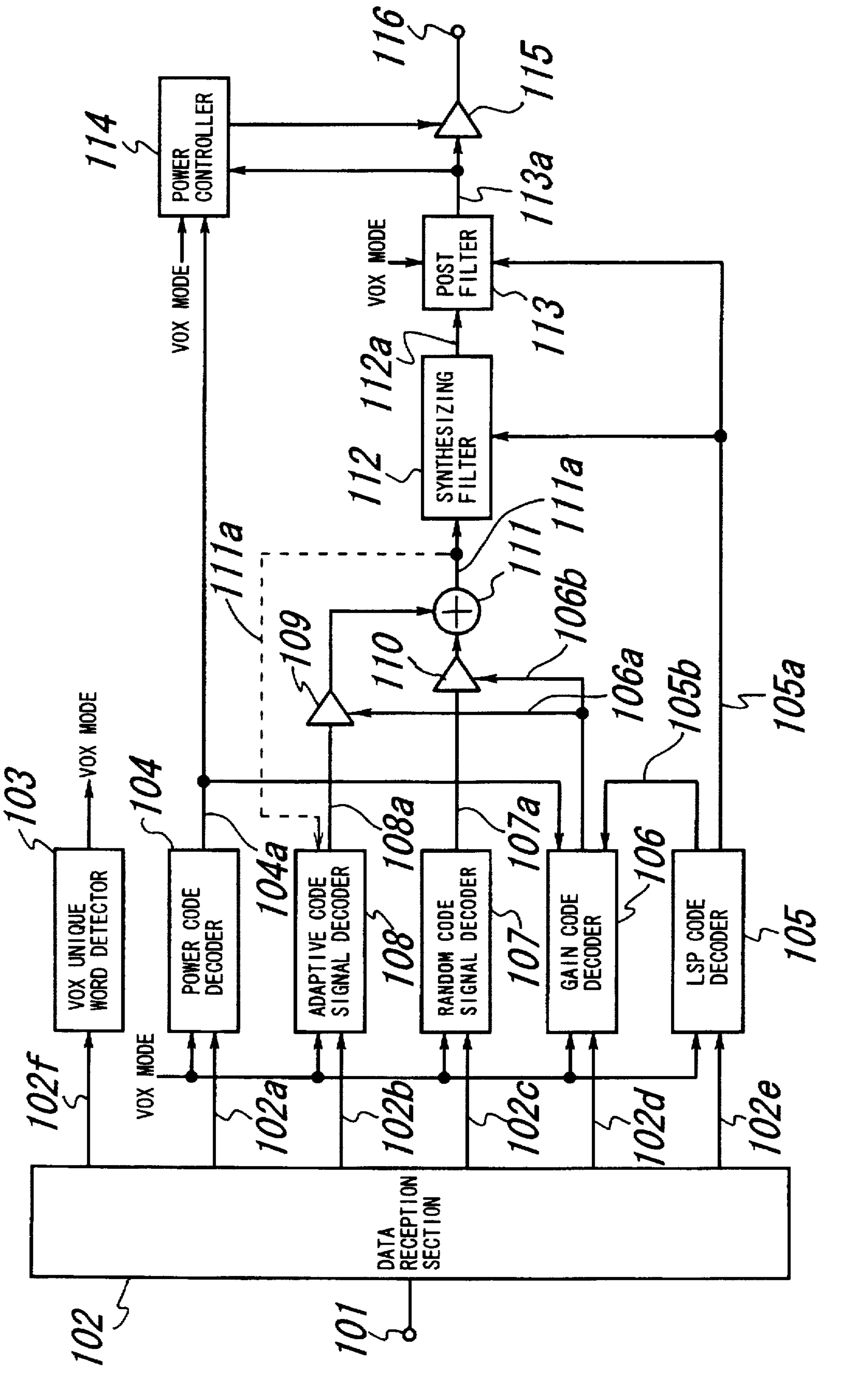
FIG. 2 is a block diagram showing an example of a construction of a reception side system of the speech encoding communication system to which the present invention is applied.
Figure 4:
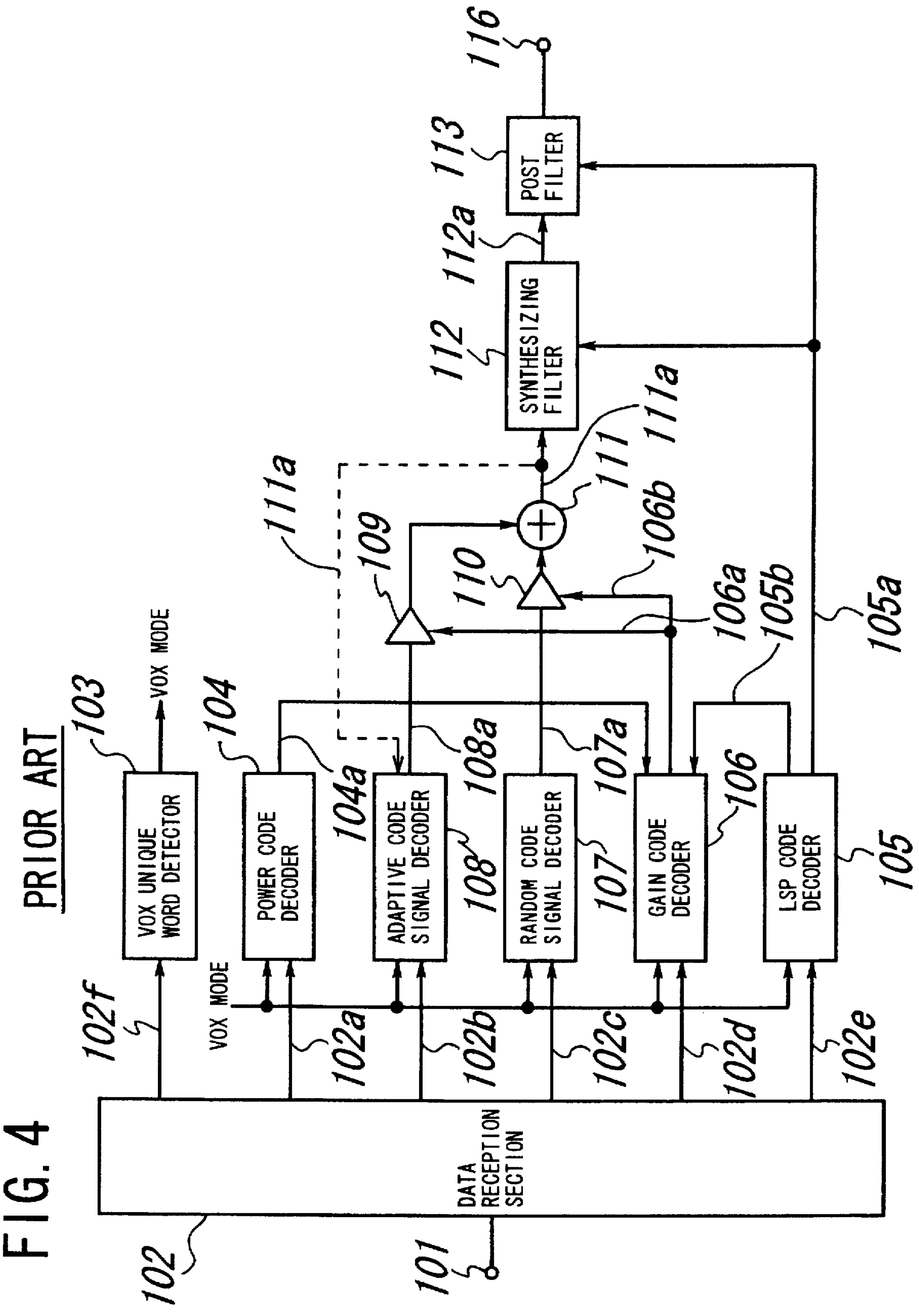
FIG. 4 PRIOR ART
FIG. 4 is a block diagram showing a construction of a reception side system of the conventional speech encoding communication system.

Referring now to FIG. 2, there is shown an example of a construction of a reception side system of the speech encoding communication system to which the present invention is applied. The reception side system shown includes an input terminal 101, a data reception section 102, a VOX unique word detector 103, a power code decoder 104, an LSP code decoder 105, a gain code decoder 106, a random code signal decoder 107, an adaptive code signal decoder 108, a pair of multipliers 109 and 110, an adder 111, a synthesizing filter 112, a post filter (adaptive spectrum post filter) 113 and an output terminal 116, which are the components of the reception side system of the conventional speech encoding communication system described hereinabove with reference to FIG. 4. Detailed description of the individual common components is omitted herein to avoid redundancy. The present reception side system additionally includes a power controller 114 and a further multiplier 115.

In operation, the data reception section 102 receives coded data from the input terminal 101, separates the coded data and outputs indices obtained by the separation including a power index **102*a*, an adaptive code index 102*b*, a noise code index 102*c*, a gain code index 102*d*, and a line spectrum pair (LSP) index 102*e*. Further, the data reception section 102 outputs the received coded data as coded data 102*f* to the VOX unique word detector 103**.

The VOX unique word detector 103 detects a postamble and a preamble outputted from a mobile station and outputs VOX MODE information representative of a sound present interval or a sound absent interval. Here, the VOX mode information is set, for example, to state "−1" when a preamble is detected, to state "1" when a postamble is detected, to state "2" when coded indices are received subsequently to the postamble, to state "3" when a coded index is received until a preamble is thereafter received, and to state "0" when a coded index is received after the preamble is detected. The conditions in state "2" and state "3" correspond to a sound absent interval in which background noise is to be produced.

The power code decoder 104 outputs a quantized power value **104*a* from a power codebook (not shown) based on the power index 102*a***.

The LSP code decoder 105 outputs an LPC **105*a* and a predictive residual gain 105*b* from an LSP codebook (not shown) based on the LSP index 102*e***.

The gain code decoder 106 receives the quantized power value **104*a*, the predictive residual gain 105*b* and the gain code index 102*d* and outputs an adaptive code gain coefficient 106*a* and a noise code gain coefficient 106*b* from a gain codebook (not shown) based on the gain code index 102*d***.

The random code signal decoder 107 outputs a noise code vector signal **107*a* based on the noise code index 102*c***.

The adaptive code signal decoder 108 outputs an adaptive code vector signal **108*a* based on the adaptive code index 102*b*. The adaptive codebook used by the adaptive code signal decoder 108 is updated by the excitation signal 111*a*** to produce a new adaptive codebook.

The multiplier 109 multiplies the adaptive code vector signal **108*a* by the adaptive code gain coefficient 106*a* to produce a signal while the multiplier 110 multiplies the noise code vector signal 107*a* by the noise code gain coefficient 106*b* to produce another signal. The output signals of the multipliers 109 and 110 are inputted to the adder 111, from which an excitation signal 111*a*** is outputted.

The synthesizing filter 112 receives the LPC **105*a* and the excitation signal 111*a* and outputs a synthetic sound signal 112*a*. Further, the auditory quality of the synthetic sound signal 112*a* is improved by the adaptive spectrum post filter 113**.

The adaptive spectrum post filter 113 receives the synthetic sound signal **112*a*, the LPC 105*a* and the VOX mode information and controls the adaptive spectrum post filter 113 so that, when the VOX mode information represents a sound absent interval and background noise is to be produced, the adaptive spectrum post filter 113 does not perform filtering, but when the VOX mode information represents a sound present interval, the adaptive spectrum post filter 113 performs filtering. As a result of the control, the adaptive spectrum post filter 113** suppresses frequency emphasis upon production of background noise.

When the VOX mode information represents a sound absent interval, background noise is produced using the indices in the coded data following a postamble as initial values.

The adaptive code signal decoder 108 receives the adaptive code index **102*b* and the VOX mode information and outputs, when the VOX mode information represents a sound absent interval and background noise is to be produced, a fixed index (for example, an index which does not depend upon an adaptive codebook) in place of the inputted adaptive code index 102*b* as an adaptive code vector signal 108*a***.

The power controller 114 receives the quantized power value **104*a*, the VOX mode information and a sound signal 113*a* outputted from the adaptive spectrum post filter 113, and calculates a power value of the sound signal 113*a*. Then, when the VOX mode information represents a sound absent interval, the power controller 114 calculates an average of a quantized power over a long period and performs level adjustment of the sound signal 113*a* via the multiplier 115 so that the power value of the sound signal 113*a*** may be equal to the long period average power value thereby to suppress a sudden level variation of background noise.

In this manner, with the reception side system of the speech encoding communication system described above, since different condition control is performed depending upon a sound present interval or a sound absent interval based on VOX mode information outputted from the VOX unique word detector 103, an unfamiliar feeling arising from a cyclic tone variation of background noise can be reduced.

Having now fully described the invention, it will be apparent to one of ordinary skill in the art that many changes and modifications can be made thereto without departing from the spirit and scope of the invention as set forth herein.

What is claimed is:

1. A speech encoding communication system, comprising:

a power quantizer for calculating and quantizing a power value of a sound signal inputted to said speech encoding communication system and outputting a power index and the quantized power value;

a pitch analyzer for applying linear predictive reverse filtering to the sound signal and outputting a plurality lag candidates from an auto-correlation of an linear predictive coefficient predictive residual signal;

a sound presence/absence detector for receiving the sound signal and a predictive residual gain, detecting presence or absence of sound from the sound signal and outputting VOX mode information representing a sound present condition or a sound absent condition;

a linear predictive coefficient detector for calculating and outputting a linear predictive coefficient from the sound signal, for converting the linear predictive coefficient into a line spectrum pair and outputting the line spectrum pair and for receiving the VOX mode information outputted from said sound presence/absence detector and outputting, when the VOX mode information represents a sound absent condition, a unique value as the linear predictive coefficient;

said power quantizer, said pitch analyzer, said sound presence/absence detector and said linear predictive coefficient analyzer being connected in parallel;

a line spectrum pair quantizer for receiving and quantizing the line spectrum pair, converting the quantized line spectrum pair into a quantized linear predictive coefficient and outputting a line spectrum pair index, the quantized linear predictive coefficient and a predictive residual gain which is to be inputted to said sound presence/absence detector;

an audition weighting filter for receiving the linear predictive coefficient and calculating a filter coefficient to be used for audition weighting and for receiving the sound signal and outputting an audition weighted sound signal;

an audition weighted synthesizing filter for receiving the quantized linear predictive coefficient and a zero signal and outputting a zero input response signal;

a subtractor for subtracting the zero input response signal from the output signal of said audition weighting filter;

an adaptive codebook search unit for receiving an output signal of said subtractor, the quantized linear predictive coefficient and the lag candidates, calculating cross-correlations between signals obtained by weighted synthesis of the lag candidates and a signal obtained by subtraction of the zero input response output signal from the audition weighted sound signal, searching for a noise code vector signal with which a maximum value is exhibited among the cross-correlations and outputting an adaptive codebook index and an adaptive code vector signal;

a random codebook search unit for receiving the output signal of said subtractor, the quantized linear predictive coefficient and the adaptive code vector signal, calculating cross-correlations between signals obtained by orthogonalization and weighted synthesis processing of individual noise code vectors with the adaptive code vector signal and a signal obtained by subtraction of the zero input response output signal from the audition weighted sound signal, searching for a noise code vector signal with which a maximum value is provided among the cross-correlations, and outputting a noise codebook index and the noise code vector signal;

a gain codebook search unit for receiving the output signal of said subtractor, the adaptive code vector signal, the noise code vector signal, the power value and the predictive residual gain, searching for a gain codebook with which an error of the output signal of said subtractor from a sum value of the noise code vector signal multiplied by a gain and the adaptive code vector signal exhibits a minimum value, and outputting a gain codebook index;

a VOX unique word generator for outputting unique pattern data of a VOX; and a data delivery section for receiving the power index, the adaptive codebook index, the noise codebook index, the gain codebook index, the line spectrum pair index, a VOX unique word outputted from said VOX unique word generator and the VOX mode information, converting the inputted information into coded data of a predetermined format and outputting the coded data.

2. A speech encoding communication system as claimed in claim 1, further comprising a low-pass filter for suppressing high frequency components of the inputted sound signal and outputting a resulted signal, and wherein said audition weighting filter selectively receives the speech signal or the output signal of said low-pass filter in response to the VOX mode information outputted from said sound presence/absence detector and outputs an audition weighted sound signal.

3. A speech encoding communication system as claimed in claim 1, wherein said power quantizer receives the VOX mode information outputted from said sound presence/absence detector and outputs, when the VOX mode information represents a sound absent condition, a power index calculated from a power value obtained by averaging the power value over a long period.

4. A speech encoding communication system as claimed in claim 1, wherein said line spectrum pair quantizer receives the VOX mode information outputted from said sound presence/absence detector and outputs, when the VOX mode information represents a sound absent condition, a quantized line spectrum pair index and a quantized linear predictive coefficient obtained when the linear predictive coefficient has a unique value.

5. A speech encoding communication system as claimed in claim 1, wherein said adaptive codebook search unit receives the VOX mode information outputted from said sound presence/absence detector and outputs, when the VOX mode information represents a sound absent condition, a unique value as the adaptive codebook index.

6. A speech encoding communication system as claimed in claim 1, wherein said adaptive codebook search unit receives the VOX mode information outputted from said sound presence/absence detector and controls, when the VOX mode information represents a sound absent condition, the adaptive codebook index to the unique value without performing searching processing.

7. A speech encoding communication system, comprising:

a low-pass filter for attenuating high frequency components from a sound signal inputted to said speech encoding communication system;

a sound presence/absence detector for receiving the sound signal and a predictive residual gain, detecting presence or absence of sound from the sound signal and outputting VOX mode information representing a sound present condition or a sound absent condition;

an audition weighting filter for selectively receiving the speech signal or an output of said low-pass filter in response to the VOX mode information outputted from said sound presence/absence detector and outputting an audition weighted sound signal;

a power quantizer for receiving the VOX mode information outputted from said sound presence/absence detector and outputting, when the VOX mode information represents a sound absent condition, a power index calculated from a power value averaged over a long period;

a linear predictive coefficient detector for receiving the VOX mode information outputted from said sound presence/absence detector and outputting, when the VOX mode information represents a sound absent condition, a unique value as a linear predictive coefficient;

a line spectrum pair quantizer for receiving the VOX mode information outputted from said sound presence/absence detector and outputting, when the VOX mode information represents a sound absent condition, a quantized line spectrum pair index and a quantized linear predictive coefficient obtained when the linear predictive coefficient has a unique value;

a pitch analyzer for applying linear predictive reverse filtering to the inputted sound signal and outputting a plurality lag candidates from an auto-correlation of an linear predictive coefficient predictive residual signal;

an adaptive codebook search unit for receiving the VOX mode information outputted from said sound presence/absence detector and controlling, when the VOX mode information represents a sound absent condition, an adaptive codebook index to a unique value without performing searching processing;

a random codebook search unit for searching for a noise code vector signal and outputting a noise codebook index and the noise code vector signal;

a gain codebook search unit for outputting a gain codebook index;

a VOX unique word generator for outputting unique pattern data of a VOX; and a data delivery section for receiving the power index, the adaptive codebook index, the noise codebook index, the gain codebook index, the line spectrum pair index, a VOX unique word outputted from said VOX unique word generator and the VOX mode information, converting the inputted information into coded data of a predetermined format and outputting the coded data.

8. A speech encoding communication system, comprising:

a data reception section for receiving and separating coded data into a power index, an adaptive code index, a noise code index, a gain code index and a line spectrum pair index and outputting the thus separated indices and the received coded data;

a VOX unique word detector for receiving the coded data outputted from said data reception section and outputting VOX mode information;

a power code decoder for receiving the power index and the VOX mode information and outputting a quantized power;

a noise code decoder for receiving the noise code index and the VOX mode information and outputting a noise code vector signal;

a line spectrum pair code decoder for receiving the line spectrum pair index and the VOX mode information and outputting a linear predictive coefficient and a predictive residual gain;

a gain code decoder for receiving the gain code index, the VOX mode information, the quantized power value and the predictive residual gain and outputting an adaptive code gain coefficient and a noise code gain coefficient;

an adaptive code signal decoder for receiving the adaptive code index, the VOX mode information and an excitation signal and outputting an adaptive code vector signal;

an adder for adding a signal obtained by multiplication of the adaptive code vector signal by the adaptive code gain coefficient and another signal obtained by multiplication of the noise code vector signal by the noise code gain coefficient and outputting an excitation signal to be inputted to said adaptive code signal decoder;

a synthesizing filter for receiving the excitation signal and the linear predictive coefficient and outputting a synthetic sound signal;

a post filter for receiving the synthetic sound signal and the linear predictive coefficient and outputting a sound signal; and a power controller for receiving the quantized power, the VOX mode information and the sound signal and controlling the power of the sound signal to be outputted from said post filter when the VOX mode information represents a sound absent interval and background noise is to be produced.

9. A speech encoding transmission system as claimed in claim 8, wherein said power controller receives the quantized power, the VOX mode information and the sound signal, and, when the VOX mode information represents a sound absent interval and background noise is to be produced, calculates an average of the quantized power over a long period and controls the power of the sound signal to be outputted from said post filter so that the sound signal may have a power equal to the average of the quantized power over the long period.

10. A speech encoding transmission system as claimed in claim 9, wherein said post filter receives the synthetic sound signal, the linear predictive coefficient and the VOX mode information and does not perform filtering when the VOX mode information represents a sound absent interval and background noise is to be produced.

11. A speech encoding transmission system as claimed in claim 10, wherein said adaptive code signal decoder receives the adaptive code index, the VOX mode information and the excitation signal and outputs, when the VOX mode information represents a sound absent interval and background noise is to be produced, a fixed index as the adaptive code vector signal in place of the adaptive code index inputted thereto.

12. A speech encoding communication system, comprising:

a power quantizer for calculating and quantizing a power value of a sound signal inputted to said speech encoding communication system and outputting a power index and the quantized power value;

a sound presence/absence detector for receiving the sound signal and a predictive residual gain, detecting presence or absence of sound from the sound signal and outputting VOX mode information representing a sound present condition or a sound absent condition;

a linear predictive coefficient detector for calculating and outputting a linear predictive coefficient from the sound signal, for converting the linear predictive coefficient into a line spectrum pair and outputting the line spectrum pair and for receiving the VOX mode information outputted from said sound presence/absence detector and outputting, when the VOX mode information represents a sound absent condition, a unique value as the linear predictive coefficient;

a pitch analyzer for applying linear predictive reverse filtering to the sound signal and outputting a plurality lag candidates from an auto-correlation of an linear predictive coefficient predictive residual signal;

said power quantizer, said pitch analyzer, said sound presence/absence detector and said linear predictive coefficient analyzer being connected in parallel;

a line spectrum pair quantizer for receiving and quantizing the line spectrum pair, converting the quantized line spectrum pair into a quantized linear predictive coefficient and outputting a line spectrum pair index, the quantized linear predictive coefficient and a predictive residual gain which is to be inputted to said sound presence/absence detector;

an audition weighting filter for receiving the linear predictive coefficient and calculating a filter coefficient to be used for audition weighting and for receiving the sound signal and outputting an audition weighted sound signal;

an audition weighted synthesizing filter for receiving the quantized linear predictive coefficient and a zero signal and outputting a zero input response signal;

a subtractor for subtracting the zero input response signal from the output signal of said audition weighting filter;

an adaptive codebook search unit for receiving an output signal of said subtractor, the quantized linear predictive coefficient and the lag candidates, calculating cross-correlations between signals obtained by weighted synthesis of the lag candidates and a signal obtained by subtraction of the zero input response output signal from the audition weighted sound signal, searching for a noise code vector signal with which a maximum value is exhibited among the cross-correlations and outputting an adaptive codebook index and an adaptive code vector signal;

a random codebook search unit for receiving the output signal of said subtractor, the quantized linear predictive coefficient and the adaptive code vector signal, calculating cross-correlations between signals obtained by orthogonalization and weighted synthesis processing of individual noise code vectors with the adaptive code vector signal and a signal obtained by subtraction of the zero input response output signal from the audition weighted sound signal, searching for a noise code vector signal with which a maximum value is provided among the cross-correlations, and outputting a noise codebook index and the noise code vector signal;

a gain codebook search unit for receiving the output signal of said subtractor, the adaptive code vector signal, the noise code vector signal, the power value and the predictive residual gain, searching for a gain codebook with which an error of the output signal of said subtractor from a sum value of the noise code vector signal multiplied by a gain and the adaptive code vector signal exhibits a minimum value, and outputting a gain codebook index;

a VOX unique word generator for outputting unique pattern data of a VOX;

a data delivery section for receiving the power index, the adaptive codebook index, the noise codebook index, the gain codebook index, the line spectrum pair index, a VOX unique word outputted from said VOX unique word generator and the VOX mode information, converting the inputted information into coded data of a predetermined format and outputting the coded data;

a data reception section for receiving and separating coded data into a power index, an adaptive code index, a noise code index, a gain code index and a line spectrum pair index and outputting the thus separated indices and the received coded data;

a VOX unique word detector for receiving the coded data outputted from said data reception section and outputting VOX mode information;

a power code decoder for receiving the power index outputted from said data reception section and the VOX mode information and outputting a quantized power;

a noise code decoder for receiving the noise code index outputted from said data reception section and the VOX mode information and outputting a noise code vector signal;

a line spectrum pair code decoder for receiving the line spectrum pair index outputted from said data reception section and the VOX mode information and outputting a linear predictive coefficient and a predictive residual gain;

a gain code decoder for receiving the gain code index outputted from said data reception section, the VOX mode information, the quantized power value and the predictive residual gain and outputting an adaptive code gain coefficient and a noise code gain coefficient;

an adaptive code signal decoder for receiving the adaptive code index outputted from said data reception section, the VOX mode information and an excitation signal and outputting an adaptive code vector signal;

an adder for adding a signal obtained by multiplication of the adaptive code vector signal by the adaptive code gain coefficient and another signal obtained by multiplication of the noise code vector signal by the noise code gain coefficient and outputting an excitation signal to be inputted to said adaptive code signal decoder;

a synthesizing filter for receiving the excitation signal and the linear predictive coefficient and outputting a synthetic sound signal;

a post filter for receiving the synthetic sound signal and the linear predictive coefficient and outputting a sound signal; and a power controller for receiving the quantized power, the VOX mode information and the sound signal outputted from said post filter and controlling the power of the sound signal to be outputted from said post filter when the VOX mode information represents a sound absent interval and background noise is to be produced.

13. A speech encoding communication system, comprising:

a low-pass filter for attenuating high frequency components from a sound signal inputted to said speech encoding communication system;

a sound presence/absence detector for receiving the sound signal and a predictive residual gain, detecting presence or absence of sound from the sound signal and outputting VOX mode information representing a sound present condition or a sound absent condition;

an audition weighting filter for selectively receiving the speech signal or an output of said low-pass filter in response to the VOX mode information outputted from said sound presence/absence detector and outputting an audition weighted sound signal;

a power quantizer for receiving the VOX mode information outputted from said sound presence/absence detector and outputting, when the VOX mode information represents a sound absent condition, a power index calculated from a power value averaged over a long period;

a linear predictive coefficient detector for receiving the VOX mode information outputted from said sound presence/absence detector and outputting, when the VOX mode information represents a sound absent condition, a unique value as a linear predictive coefficient;

a line spectrum pair quantizer for receiving the VOX mode information outputted from said sound presence/absence detector and outputting, when the VOX mode information represents a sound absent condition, a quantized line spectrum pair index and a quantized linear predictive coefficient obtained when the linear predictive coefficient has a unique value;

a pitch analyzer for applying linear predictive reverse filtering to the inputted sound signal and outputting a plurality lag candidates from an auto-correlation of an linear predictive coefficient predictive residual signal;

an adaptive codebook search unit for receiving the VOX mode information outputted from said sound presence/absence detector and controlling, when the VOX mode information represents a sound absent condition, an adaptive codebook index to a unique value without performing searching processing;

a random codebook search unit for searching for a noise code vector signal and outputting a noise codebook index and the noise code vector signal;

a gain codebook search unit for outputting a gain codebook index;

a VOX unique word generator for outputting unique pattern data of a VOX;

a data delivery section for receiving the power index, the adaptive codebook index, the noise codebook index, the gain codebook index, the line spectrum pair index, a VOX unique word outputted from said VOX unique word generator and the VOX mode information, converting the inputted information into coded data of a predetermined format and outputting the coded data;

a data reception section for receiving and separating coded data into a power index, an adaptive code index, a noise code index, a gain code index and a line spectrum pair index and outputting the thus separated indices and the received coded data;

a VOX unique word detector for receiving the coded data outputted from said data reception section and outputting VOX mode information;

a power code decoder for receiving the power index outputted from said data reception section and the VOX mode information and outputting a quantized power;

a noise code decoder for receiving the noise code index outputted from said data reception section and the VOX mode information and outputting a noise code vector signal;

a line spectrum pair code decoder for receiving the line spectrum pair index outputted from said data reception section and the VOX mode information and outputting a linear predictive coefficient and a predictive residual gain;

a gain code decoder for receiving the gain code index outputted from said data reception section, the VOX mode information, the quantized power value and the predictive residual gain and outputting an adaptive code gain coefficient and a noise code gain coefficient;

an adaptive code signal decoder for receiving the adaptive code index outputted from said data reception section, the VOX mode information and an excitation signal and outputting an adaptive code vector signal;

an adder for adding a signal obtained by multiplication of the adaptive code vector signal by the adaptive code gain coefficient and another signal obtained by multiplication of the noise code vector signal by the noise code gain coefficient and outputting an excitation signal to be inputted to said adaptive code signal decoder;

a synthesizing filter for receiving the excitation signal and the linear predictive coefficient and outputting a synthetic sound signal;

a post filter for receiving the synthetic sound signal and the linear predictive coefficient and outputting a sound signal; and a power controller for receiving the quantized power, the VOX mode information and the sound signal outputted from said post filter and controlling the power of the sound signal to be outputted from said post filter when the VOX mode information represents a sound absent interval and background noise is to be produced.

* * * * *